(No Model.)

3 Sheets—Sheet 1.

E. WESTHOFF.
COMBINED CULTIVATOR AND CORN PLANTER.

No. 368,799.

Patented Aug. 23, 1887.

WITNESSES:
Donn Twitchell
C. Sedgwick

INVENTOR:
E. Westhoff
BY Munn & Co.
ATTORNEYS.

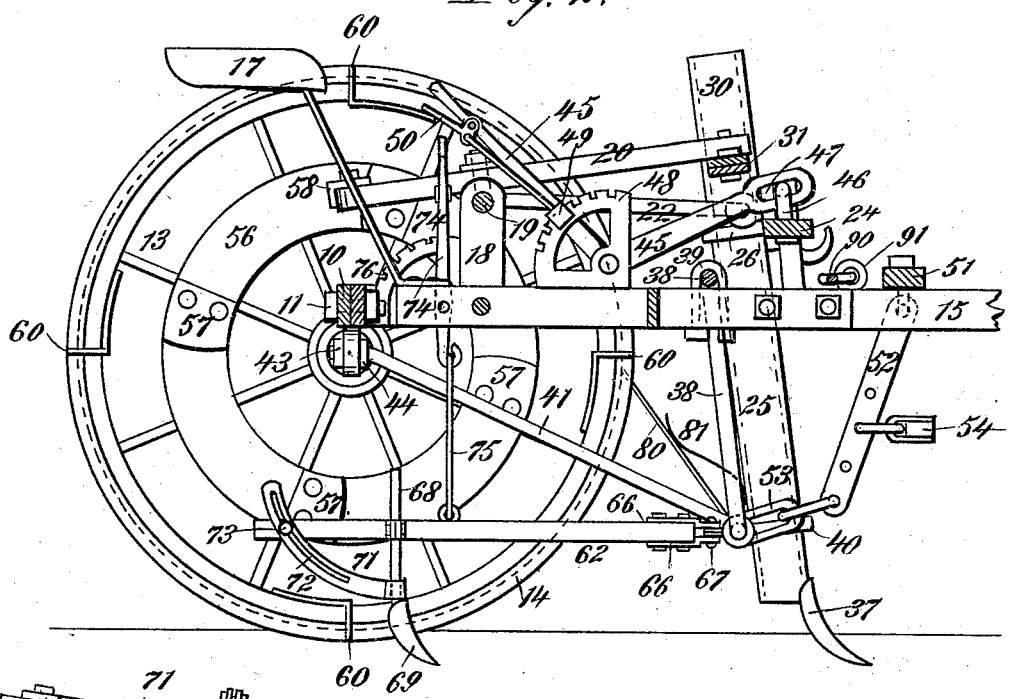

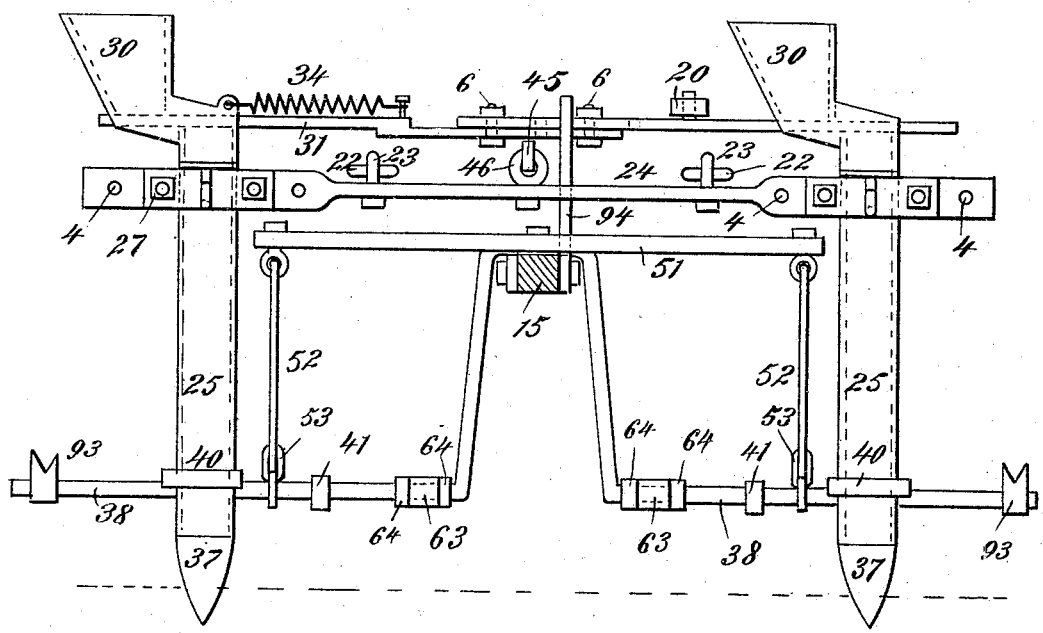

UNITED STATES PATENT OFFICE.

EMIL WESTHOFF, OF CUERO, TEXAS.

COMBINED CULTIVATOR AND CORN-PLANTER.

SPECIFICATION forming part of Letters Patent No. 368,799, dated August 23, 1887.

Application filed April 22, 1887. Serial No. 235,783. (No model.)

*To all whom it may concern:*

Be it known that I, EMIL WESTHOFF, of Cuero, in the county of De Witt and State of Texas, have invented a new and Improved Combined Cultivator and Check-Row Corn-Planter, of which the following is a full, clear, and exact description.

This invention relates to an improvement in check-row planters and cultivators, the main objects of the invention being to provide a planter that shall be self-covering and adjustable as to the transverse and longitudinal space between the hills and rows, and which at the same time may be regulated as to the amount of material fed at each throw of the seed-slide, and which will also mark off the adjacent row as the machine advances, all of which objects I accomplish by means of the novel form of planter to be hereinafter described, and specifically pointed out in the claims.

Reference is to be had to the accompanying drawings, forming a part of this specification, in which similar figures of reference indicate corresponding parts in all the views.

Figure 1:
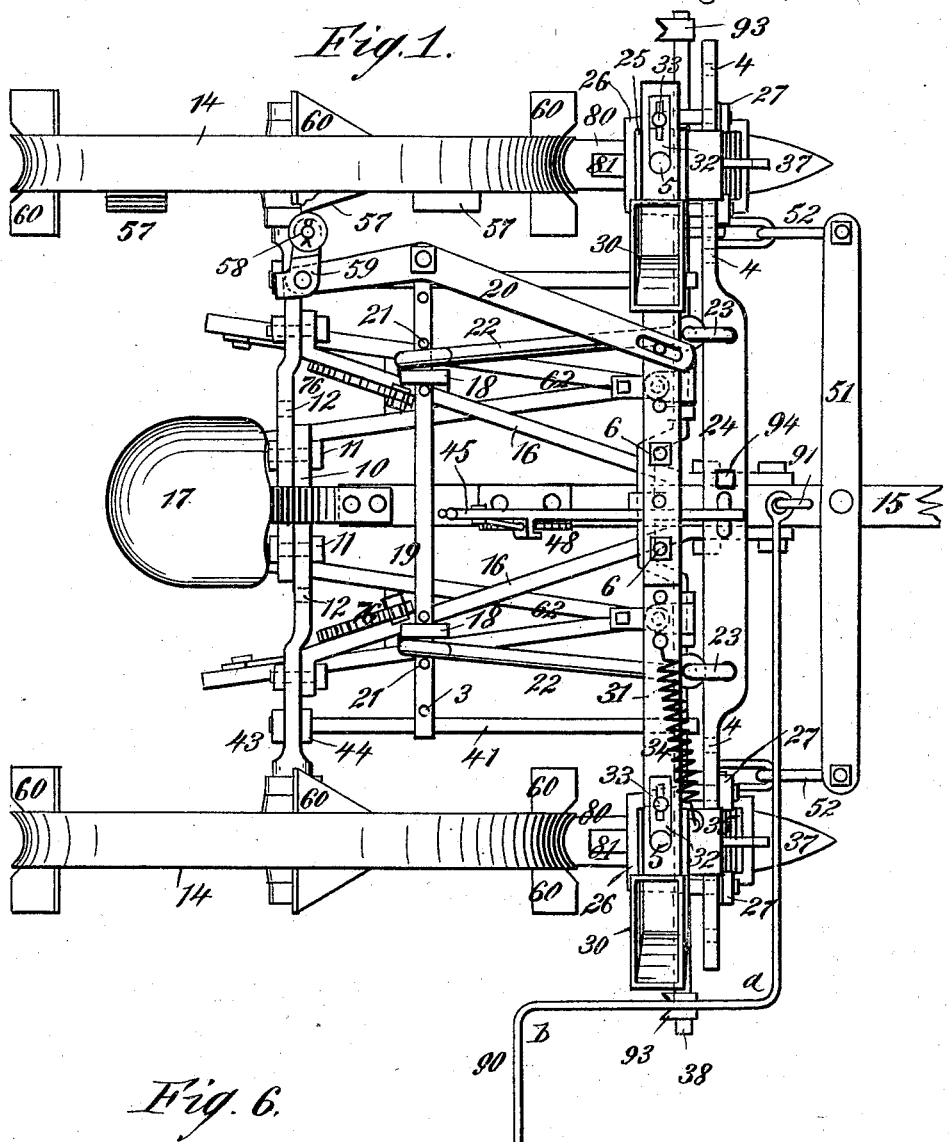
Figure 6:
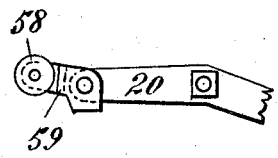

Figure 1 is a plan view of my improved form of cultivator. Fig. 2 is a central sectional elevation of my improved form of combined cultivator and planter. Fig. 3 is a detail view of one pair of cultivator-beams, representing the connection of said beams with the planter proper, the seed-delivery trough illustrated in the figure being shown in section. Fig. 4 is a detail view of the adjustable connection between the two cultivator-beams. Fig. 5 is a front view of the machine, the wheels, however, not being shown and the marker being removed; and Fig. 6 is a detail view illustrating the arrangement of the inner end of the feed-slide lever.

One of the principal objects of this invention is to provide a machine wherein the width between the rows may be varied as well as the distance between the hills in the rows, and to this end I provide an axle, 10, that is made up of two sections, said sections being formed to overlap, and these overlapping portions being provided with properly-located apertures through which there are passed clamping-bolts 11, the position of apertures other than those through which the bolts are passed being indicated by dotted lines at 12. The peripheral faces of the wheels 13 are provided with concave-faced plates 14.

The pole or tongue 15 is connected to the axle 10 by braces 16, and upon the rear end of this tongue or pole the seat 17 is mounted in the usual well-known manner. The braces 16 carry vertical standards 18, which serve as supports for a horizontal rod, 19, to one end of which there is pivotally connected a seed-slide lever, 20, the rod 19 being held against lateral displacement by pins 21, which may be passed through any one of a series of apertures, 3, that are formed in each end of the rod 19, this arrangement being provided in order that the lever 20 may operate properly in connection with its slide irrespective of the adjustment of the machine as to the space between the rows.

Two forwardly-extending arms, 22, are loosely mounted upon the rod 19, and these arms 22 are connected by means of links or eyebolts 23 with a transverse bar, 24, to which transverse bar the seed-delivery troughs 25 are connected by clips 26, the arms of said clips passing through proper apertures that are formed in the bar 24 to engage with nuts 27, as shown in Fig. 1; and in order that the seed-delivery troughs may be moved outward or inward upon the bar 24, I make a number of apertures, 4, in said bar, with any proper pair of which the clips 26 may be made to engage.

The seed boxes or hoppers, which are shown at 30, are rigidly connected to the upper ends of the seed-delivery troughs 25; but the hoppers are located at one side of the seed-delivery troughs, as shown, and arranged to receive a slide, 31, which slide is formed with delivery-apertures 5, the size of which may be regulated by plates 32, that are held in recesses formed in the upper face of the slide by a set-screw, 33.

A spring, 34, normally acts to hold the slide 31 so that its apertures 5 will be within the feed boxes or hoppers 30, one end of the spring being connected to the slide, while the other is connected to one of the feed-boxes—for instance, by a hook, as 35, as shown in Fig. 1. The slide 31 is made in two sections that are united by bolts 6, so as to provide for a proper adjustment of the slide in case the space between the rows is changed by lengthening or shortening the axle 10, the retaining-bolts being passed through apertures formed in the sections that are brought in register when the proper adjustment of the slide is brought about.

Furrow-opening shovels 37 are connected to the lower ends of the seed-delivery troughs 25, and these furrow-opening shovels should be directly in front of the wheels 13. It will be noticed that the seed-troughs 25 constitute the standards of the shovels 37, and in order that the troughs may be relieved of any undue strain I provide a crank-bar, 38, that is held to the tongue 15 by a clip, 39, said crank-bar being connected to the troughs 25 by clips 40, the bar being formed with a number of apertures, so that the clip is adjusted toward or from either of its ends. To impart a proper rigidity to the bar 38, I arrange rearwardly-extending braces 41, which pass through the axle 10 to engage with nuts 43, limit-nuts 44 being carried by the bars at the forward side of the axle.

In order that the furrow-opening shovels 37 may be raised from the ground when the machine is to be transported from place to place, I mount a lever, 45, upon the rear end of the tongue 15, and the short arm of this lever I connect by means of an eye, 46, with the bar 24, the forward end of said short arm being formed with a slot, 47, through which the eye 46 passes. In connection with the lever 45, I arrange a segmental rack, 48, that is engaged by a catch, 49, carried by the lever and operated by a thumb-piece, 50, the arrangement being such that when the handle of the lever is drawn backward the shovels 37 will be raised from the ground.

The doubletree of the planter is, as usual, pivotally connected to the tongue 15, this doubletree being shown at 51, and from the ends of said doubletree I attach downwardly-extending apertured bars 52, which are connected to the crank bar or rod 38 by links 53, as shown in Figs. 2 and 5, the singletrees 54 being connected to these bars 52 at such point as may be required to equalize the draft.

A metallic disk or plate, 56, is connected to the wheel 13, which is close to the feed-slide lever 20, and upon this disk or plate I secure a number of cam-faces, 57, against which the anti-friction roller 58, that is carried by the lever 20, rides, the arrangement being such that as each cam throws the short arm of the lever 20 in toward the center line of the machine the slide 31 will be thrown forward against the tension of the spring 34, and the corn within the apertures 5 will be delivered to the seed-troughs 25; but in order that the roller 58 may be thrown to a position so that it will not be moved by the cams 57, I mount said roller upon a bracket, 59, which is pivotally connected to the end of the lever 20, the arrangement being such that the roller may be thrown to the position in which it is shown in Fig. 1, there to be operated upon by the cams 57; or the roller may be moved to the position in which it is shown in Fig. 6, in which case it would be carried out of the path of the cams 57.

In connection with each one of the cams 57, I arrange markers 60, said markers consisting of plates having wings which extend outward upon either side of the rim of the wheels to a position in line with the outward edges of the concave peripheral faces of the wheels, as is clearly shown in Fig. 1, these markers being provided in order that the exact location of each hill will appear upon the ground after the machine has passed over the same.

To each side of the machine I connect a pair of cultivator-beams, such as those shown at 62, said beams being connected to the crank-bar 38 by a strap, 63, which passes about said bar between two collars, 64, direct connection between the strap 63 and the cultivator-beam being established by irons 66, that are bolted to the beams, and a bolt, 67, which passes through the apertured ends of the strap and the apertured ends of the irons 66.

The standards 68 of the cultivator-shovels 69 are connected to the beams 62 by means of bolts 70, said bolts being provided with clamping-arms at their extending ends, and being free to slightly move within their bearings, the arrangement being such that the angle of the standards may be changed to suit the requirements of the case, while the standards are held in proper positions by rearwardly-extending curved braces 71, that are formed with slots 72, through which there are passed clamping-bolts 73, as best shown in Figs. 2 and 3.

The beams 62 are connected with levers 74 by means of links 75, and these levers are arranged so that when turned down they may be brought into engagement with a rack, 76, and being so turned down the beams 62 will be raised and the shovels 69 drawn up above the level of the ground.

In connection with each of the wheels I arrange a clearer, 80, said clearers being mounted upon the rod 38 just back of the seed-delivery troughs, and arranged so that their free ends may be held within the recesses of the rims 14 by springs 81.

A long rod, 90, formed with rectangular bends a and b, is connected to the tongue 15 by an eyebolt, 91, and upon the end of this rod there is mounted a marking-shoe, 92, the rod being supported by a claw, 93, that is fixed to the end of the bar 38, and in adjusting the shoe it should be placed so that the space between it and its approaching wheel shall be equal to the distance between the wheels.

Such being the general construction of my improved form of planter and cultivator, the operation is as follows: The machine having been adjusted to proper width and the wheels placed upon the lines of the proposed rows and adjusted so that their markers 60 shall be in the same lines, and the rod 90 adjusted so that its shoe will lay off the line of the row next to those that are to be planted, the machine may be started forward, and as it so moves forward the lever 20 will be thrown by the action of the cams 57 so that the slide 31 will be moved to deliver a planting from each hopper to the seed-delivery troughs, the furrows for the seed to drop into being opened by the shovels 37, and as the machine advances the concave-faced rims that are secured to the wheels will act to close the loosened earth down about the furrow, the location of each hill being indicated by the marks made by the markers 60.

After the end of the row is reached the lever 45 is thrown back, the bar 24 is raised, and with it all of the parts carried thereby, this bar being held against lateral displacement by an upwardly-extending spur or horn, 94, and while the machine is being turned the roller 58 is thrown to the position in which it is shown in Fig. 6, so that it will not be operated upon by the cams 57. Then as the machine is turned around one of the wheels is brought into line with the mark made by the shoe 92, the rod 90 is turned over and thrown into engagement with the opposite claw 93, and the machine again started forward, care being taken that the markers 60 of each wheel are in line.

When it is desired to use the machine as a cultivator and not as a planter, the rims 14 and markers 60 might be removed and the lever 45 thrown back to raise the shovels 37 from the ground; and if at any time it is desired to plant in drills, or to increase the number of hills, such change can be made by increasing the number of cams 57.

By connecting the beams 62 by such a bar as is illustrated in detail in Fig. 4 I provide for an adjustment of the beams to such width as may be required.

Although I have represented the seat as being supported by a spring-bar that is secured to the tongue, it will of course be understood that the seat might be supported by rods fixed to the diagonal braces 16, or to any other proper part of the cultivator.

Having thus fully described my invention, I claim as new and desire to secure by Letters Patent—

1. The combination, with the frame, the crank-bar 38, depending from the frame, and the braces 41, connecting the said bar and axle, of the vertically-adjustable delivery-troughs clipped near their lower ends to the lower horizontal arms of the crank-bar, substantially as set forth.

2. The combination, with the frame, the crank-bar 38, depending therefrom and having claws 93 on its ends, braces 41, connecting said bar with the axle, and the seed-spouts clippped to said crank-bar, of the rod 90, hinged to the frame at 91, bent as at *a b* to engage the claws 93, and having a shoe, 92, on its outer end, substantially as set forth.

3. In a combined cultivator and planter, the combination, with the frame, the seed-spouts, and furrow-openers, of the crank-bar 38, extending down and clipped to the seed-spouts, and the cultivator-beams 62, pivotally connected to the crank-bar between the seed-spouts, substantially as set forth.

EMIL WESTHOFF.

Witnesses:
W. WAGNER,
HENRY L. HEYER.